(12) United States Patent
Joye

(10) Patent No.: US 8,223,963 B2
(45) Date of Patent: Jul. 17, 2012

(54) METHOD AND APPARATUS FOR GENERATING A SIGNATURE FOR A MESSAGE AND METHOD AND APPARATUS FOR VERIFYING SUCH A SIGNATURE

(75) Inventor: Marc Joye, Cesson-Sevigne (FR)

(73) Assignee: Thomson Licensing, Issy les Moulineaux (FR)

( * ) Notice: Subject to any disclaimer, the term of this patent is extended or adjusted under 35 U.S.C. 154(b) by 113 days.

(21) Appl. No.: 12/737,073

(22) PCT Filed: Jun. 2, 2009

(86) PCT No.: PCT/EP2009/056759
§ 371 (c)(1),
(2), (4) Date: Dec. 6, 2010

(87) PCT Pub. No.: WO2010/000552
PCT Pub. Date: Jan. 7, 2010

(65) Prior Publication Data
US 2011/0085659 A1 Apr. 14, 2011

(30) Foreign Application Priority Data
Jun. 9, 2008 (EP) .................................... 08305240

(51) Int. Cl.
*G06F 21/00* (2006.01)
(52) U.S. Cl. ......................................................... 380/44
(58) Field of Classification Search .................... 380/44
See application file for complete search history.

(56) References Cited

PUBLICATIONS

Jove et al, "On the TYS Signature Scheme", computation Science and Its Applications—ICCSA 2006 Lecture Notes in Computer Science, vol. 3982, Springer, Berlin, DE, Jan. 1, 2006, pp. 388-344.

Gennaro et al., "Secure Hash-and-Sign Signatures Without the Random Oracle", Advances in Cryptology—EUROCRYPT '99, vol. 1592, Prague, CZ, Jan. 1, 1999, pp. 123-139.

Benoit et al, "A Practical and Tightly Secure Signature Scheme Without Hash Function", TOPIS in Cryptology—CT-RSA 2007, vol. 4377, Springer, Berlin, DE, Jan. 1, 2007, pp. 339-356.

Camenisch et al., "A Signature Scheme with Efficient Protocols", Lecutre Notes in Computer Science, vol. 2576, Berlin, DE, Jan. 1, 2003, pp. 268-289.

Search Report Dated Nov. 27, 2009.

*Primary Examiner* — Jeffrey Pwu
*Assistant Examiner* — Anthony Brown
(74) *Attorney, Agent, or Firm* — Robert D. Shedd; Jeffrey M. Navon

(57) ABSTRACT

A method of generating a signature σ for a message m, the method enabling online/offline signatures. Two random primes p and q are generated, with N=pq; two random quadratic residues g and x are chosen in $Z^*_N$, and, for an integer z, $h = g^{-z} \mod N$ is calculated. This gives the public key {g, h, x, N} and the private key {p, q, z}. Then, an integer t and a prime e are chosen. The offline signature part y may then be calculated as $y = (xg^{-t})^{1/e^b} \mod N$ where b is an integer bigger than 0, predetermined in the signature scheme. The online part k of the signature on message m is then calculated as k=t+mz and the signature σ on message m is generated as σ=(k, y, e) and returned. To verify the signature, it is checked that 1) e is an odd $I_E$-bit integer, 2) k is an $I_K$-bit integer, and 3) $y^{e^b} g^k h^m \equiv x \pmod{N}$. An advantage of the method is that it may be performed without hashing. Also provided are a signing device, a verification device, and computer program supports.

16 Claims, 2 Drawing Sheets

METHOD AND APPARATUS FOR GENERATING A SIGNATURE FOR A MESSAGE AND METHOD AND APPARATUS FOR VERIFYING SUCH A SIGNATURE

This application claims the benefit, under 35 U.S.C. §365 of International Application PCT/EP2009/056759, filed Jun. 2, 2009, which was published in accordance with PCT Article 21(2) on Jan. 7, 2010 in English and which claims the benefit of European patent application No. 080305240.7, filed on Jun. 9, 2008.

FIELD OF THE INVENTION

The present invention relates generally to cryptography, and in particular to an online/offline signature scheme that does not rely on random oracles.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

An online/offline signature scheme allows a two-phase generation of a digital signature. The most costly computations may be performed before the message to sign is known; this is the offline phase. Once the message is known, relatively rapid computations are then performed in the online phase. The skilled person will appreciate that this property is desired for time-constrained applications, such as for example electronic payments or when driving towards automated toll booths, and also for low-cost devices that do not have much in the way of computational resources.

In "On the Fly Authentication and Signature Schemes Based On Groups of Unknown Order" Journal of Cryptology, 19(4):463-487, 2006, M. Girault, G. Poupard, and J. Stern propose an online/offline signature scheme known as the GPS scheme. A drawback of this scheme is that its security proof stands in the random oracle model.

An online/offline signature scheme in the standard model (i.e. not relying on random oracles) is presented by B. Chevallier-Mames and M. Joye in "A Practical and Tightly Secure Signature Scheme Without Hash Function" in M. Abe (editor), Topics in Cryptology—CT-RSA 2007, volume 4377 of Lecture Notes in Computer Science, pages 339-356, Springer-Verlag, 2007. A drawback of this scheme resides in the size of its parameters, the public and private keys, as well as in the size of the resulting signature (both in the off-line and on-line phases). Further, it is noted that an increased size translates into an efficiency loss in computation, storage and transmission.

Another on-line/off-line signature scheme in the standard model is presented by K. Kurosawa and K. Schmidt-Samoa in "New On-line/Off-line Signature Schemes Without Random Oracles" in M. Yung et al. (editors), Public Key Cryptography—PKC 2006, volume 3958 of Lecture Notes in Computer Science, pages 330-346, Springer-Verlag, 2006. A drawback in this scheme is that the on-line phase involves a modular multiplication, which is more costly than an integer multiplication.

Further on-line/off-line signature schemes are presented by Marc Joye and Hung-Mei Lin in "On the TYS Signature Scheme". These schemes are the Tan-Yi-Siew (TYS) signature scheme in its original and in its modified form.

The original TYS scheme first generates a public key and a private key. Two random primes are chosen $p=2p'+1$ and $q=2q'+1$, where $p'$ and $q'$ are prime and $\log_2 p'q' > 2l+1$. $N=pq$. Two quadratic residues g and x in $Z^*_N$ are chosen such that the order of g is $p'q'$. Finally, a random l-bit integer z is chosen and $h=g^{-z} \bmod N$ is calculated. The public key is $pk=\{g, h, x, N\}$ and the private key is $sk=\{p, q, z\}$. m denotes the message to be signed. An l-bit integer k and an l-bit prime e are randomly picked and the following values are computed: $y=(xg^{-k})^{1/e} \bmod N$, $c=H(pk, y, m)$ and $t=k+cz$. The signature on message m is then $\sigma=(t, y, e)$. The authors discovered however that the TYS scheme was totally insecure and therefore provided a modified scheme.

The modified scheme makes use of four security parameters—$I_N$, $I_H$, $I_E$ and $I_K$—that satisfy $I_E \geq I_H+2$ and $I_K \gg I_N+I_H$. The modified scheme first generates a public key and a private key. Two random primes are chosen $p=2p'+1$ and $q=2q'+1$, where $p'$ and $q'$ are primes of equal length so that $N=pq$ is of length $I_N$. Two quadratic residues g and x in $Z^*_N$ are chosen randomly. Finally, $h=g^{-z} \bmod N$ is calculated for a random integer z mod $p'q'$. The public key is still $pk=\{g, h, x, N\}$ and the private key is $sk=\{p, q, z\}$. m denotes the message to be signed. An $I_K$-bit integer t and an $I_E$-bit prime e are randomly picked and the following values are computed: $y=(xg^{-t})^{1/e} \bmod N$, $c=H(pk, m)$ and $k=t+cz$. The signature on message m is then $\sigma=(k, y, e)$. As will be appreciated, it is mainly the lengths of some parameters that have changed, but this does in fact provide the security that the TYS scheme lacks. However, the modified scheme, which may be seen as a variant of the Camenisch-Lysyanskaya signature scheme, still requires rather much computation and provides a quite lengthy signature. For example, typical parameter lengths—$I_N=1024$, $I_H=160$, $I_E=162$ and $I_K=1344$—give a signature length of $1344+1024+162=2530$ bits for the 1024-bit RSA modulus.

It can therefore be appreciated that there is a need for an improved solution that provides online/offline digital signatures. This invention provides such a solution.

SUMMARY OF THE INVENTION

In a first aspect, the invention is directed to a method of generating a signature $\sigma$ for a message m. Three integers y, e, t, satisfying $y=(xg^{-t})^{1/e} \bmod N$ are obtained, where c depends on e, and x, g, and N are elements of a public key, x and g being quadratic residues in $Z^*_N$ and N being an $I_N$-bit integer; a first part k of a signature $\sigma$ is calculated, wherein the calculation of k comprises an integer multiplication of m and a $I_Z$-bit integer z and an addition of t; and the signature $\sigma$ is output, the signature $\sigma$ comprising at least three values k, y, and e. The lengths of k, e, z, N, and h, h being an integer element of the public key, the lengths respectively being denoted $I_K$, $I_E$, $I_Z$, $I_N$, and $I_H$, satisfy the following relations for a given value b, which denotes the relation between c and e:

$$I_N \geq 2(I_E+2);$$

$$b(I_E-1) \geq I_K+1; \text{ and}$$

$$I_N-4 \geq I_K \gg I_Z+I_H.$$

In a first preferred embodiment, e is prime and c equals e to the power of a positive integer b. This use of e raised to the power of b enables shorter signatures.

In a second preferred embodiment, N is a RSA modulus comprising at least two primes p and q. It is advantageous that $p=2p'+1$ and $q=2q'+1$, where $p'$ and $q'$ are prime.

In a third preferred embodiment, the three values y, e, t, are obtained by generating a prime e and an integer t; and calculating $y=(xg^{-t})^{1/c} \mod N$.

In a fourth preferred embodiment, the three values y, e, t are obtained from a coupon stored in a memory.

In a fifth preferred embodiment, the message m is received between the obtention of the three values y, e, t, and the calculation step of the first part k of the signature.

In a sixth preferred embodiment, the message m is output with the signature σ.

In a second aspect, the invention is directed to a method of verifying a signature σ for a message m, the signature being generated by a method according to the first aspect of the invention. It is verified that $y^c g^k h^m \equiv x(\mod N)$, wherein c depends on e and h is an element of the public key.

In a seventh preferred embodiment, it is further verified that e is odd.

In a tenth preferred embodiment, it is further verified that e is an $I_E$-bit integer and that k is an $I_K$-bit integer.

In a third aspect, the invention is directed to a device for generating a signature σ for a message m. The signature device comprises a processor adapted to obtain three integers y, e, t, satisfying $y=(xg^{-t})^{1/c} \mod N$, where c depends on e, and x, g, and N are elements of a public key, x and g being quadratic residues in $Z^*_N$ and N being an $I_N$-bit integer; and calculate a first part k of a signature σ, wherein the calculation of k comprises an integer multiplication of m and an $I_Z$-bit integer z and an addition of t. The signature device further comprises an output unit adapted to output the signature σ, the signature σ comprising at least three values k, y, and e. The lengths of k, e, z, N, and h, h being an integer element of the public key, the lengths respectively being denoted $I_K$, $I_E$, $I_Z$, $I_N$, and $I_H$, satisfy the following relations for a given value b, which denotes the relation between c and e:

$$I_N \geq 2(I_E+2);$$

$$b(I_E-1) \geq I_K+1; \text{ and}$$

$$I_N-4 \geq I_K >> I_Z+I_H.$$

In a fourth aspect, the invention is directed to a device for verifying a signature σ for a message m, the signature being generated by the method of the first aspect of the invention. The verification device comprises a processor adapted to verify that $y^c g^k h^m \equiv x(\mod N)$, wherein c depends on e and h is an element of the public key.

In a fifth aspect, the invention is directed to a computer program support storing instructions that, when executed in a processor, performs the method of signing a message m of the first aspect of the invention.

In a sixth aspect, the invention is directed to a computer program support storing instructions that, when executed in a processor, perform the method of verifying the signature σ for a message m of the second aspect of the invention.

BRIEF DESCRIPTION OF THE DRAWINGS

Preferred features of the present invention will now be described, by way of non-limiting example, with reference to the accompanying drawings, in which:

In FIGS. 2 and 3, the represented blocks are purely functional entities, which do not necessarily correspond to physically separate entities. These functional entities may be implemented as hardware, software, or a combination of software and hardware; furthermore, they may be implemented in one or more integrated circuits.

PREFERRED EMBODIMENT OF THE INVENTION

Figure 1:
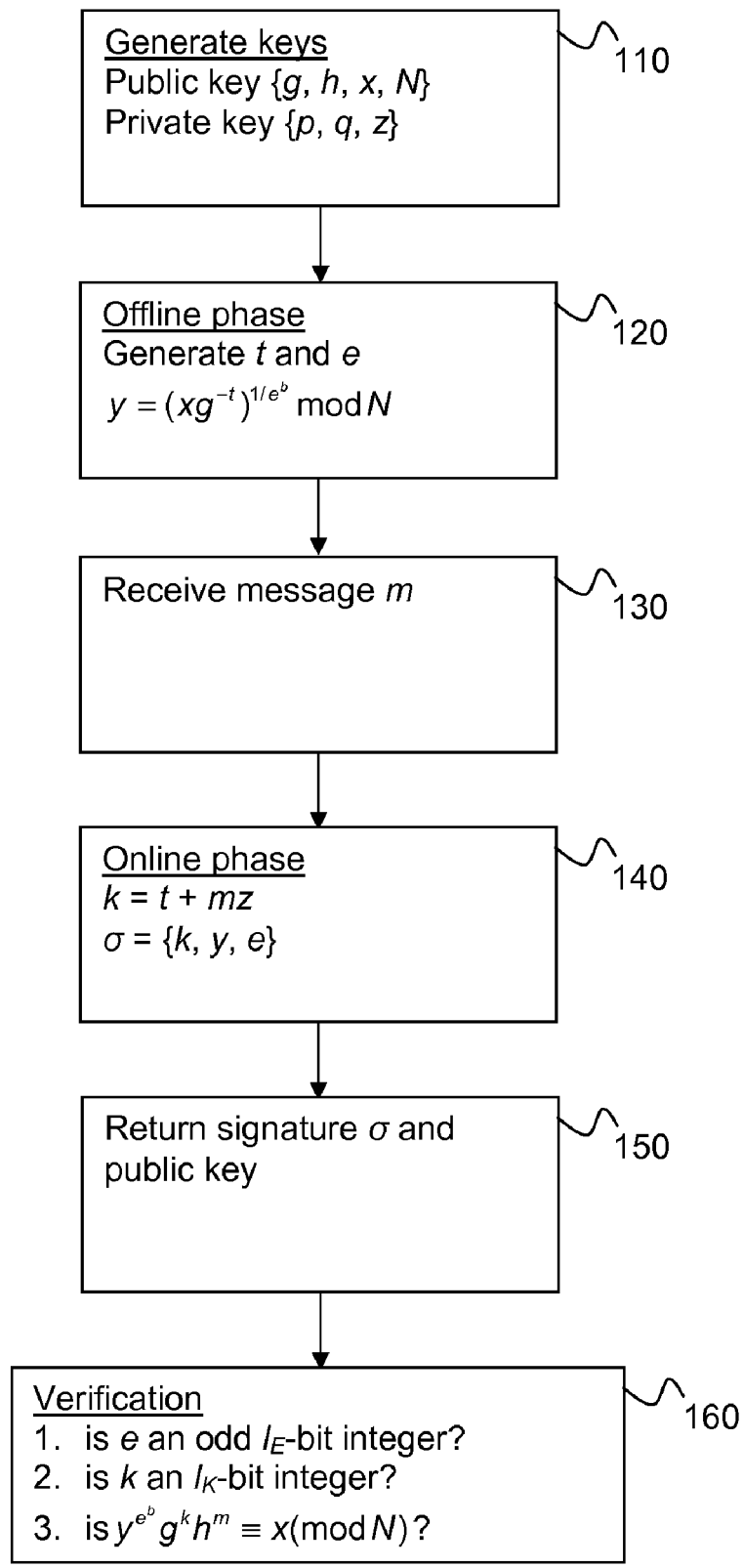
FIG. 1 illustrates a method of generating a digital signature for a message m and of verifying the digital signature, according to a preferred embodiment of the invention.

As mentioned, an online/offline signature scheme has an offline phase performed before reception of the message to sign (but which naturally may be performed also after reception) and an online phase that is performed once the message m is known. The skilled person will appreciate that message m may be a digest of a longer message.

A first part of the offline phase is key generation. First, two random primes p and q are generated; preferably p=2p'+1, q=2q'+1, where p' and q' are primes of equal length, so that N=pq is of length $I_N$. Then, two random quadratic residues g and x are chosen in $Z^*_N$. Finally, for a random $I_Z$-bit integer z, $h=g^{-z} \mod N$ is calculated.

The public key pk is then {g, h, x, N} and the private key sk is {p, q, z}.

A second part of the offline phase is the calculation of the offline part y of the signature. A random $I_K$-bit integer t and a random $I_E$-bit prime e are chosen. The offline signature part y may then be calculated as $$y=(xg^{-t})^{1/e^b} \mod N$$

where b is an integer bigger than 0, predetermined in the signature scheme.

Now, the scheme is ready for the reception of the message m to sign; m∈M, where M denoted the message space—$M=\{0,1\}^{I_H}$, which may also be viewed as the set of integers in the range $[0,2^{I_H}-1]$. The online part k of the signature may then be calculated as $$k=t+mz$$

and the signature on message m is σ=(k, y, e).

It is advantageous to verify, before transmission, that the online part k of the signature is a $I_K$-bit integer; if not, it is preferable to generate another signature based on other values. An advantage of the present scheme is that the online phase may be performed without hashing.

The signature σ is then returned for verification; if necessary, the public key is also provided and in addition, the message m may also be provided. Signature σ=(k, y, e) on message m is accepted if and only if:

1. e is an odd $I_E$-bit integer,
2. k is an $I_K$-bit integer, and
3. $y^{e^b} g^k h^m \equiv x(\mod N)$.

In the scheme, the parameters $I_K$, $I_E$, $I_Z$, $I_N$, and $I_H$ (the latter denoting the maximal length, in bits, of input message m) should satisfy the following relations for the predetermined value b:

$$I_N \geq 2(I_E+2);$$

$$b(I_E-1) \geq I_K+1; \text{ and}$$

$$I_N-4 \geq I_K >> I_Z+I_H$$

It should be noted that the value b may also be variable, in which case it could be part of the public key pk, or be included in the signature σ.

It will be appreciated that the relations above are not chosen at random, nor are they mere workshop modifications within the reach of the person skilled in the art, as the skilled person would have no reason to come up with these particular relations. After all, as has been shown regarding the TYS scheme, a signature scheme is delicate and modifications thereto are not to be undertaken lightly. These relations enable a proof of the security of the scheme, which may be said to be a significant part of the inventiveness of the present invention.

With exemplary, typical values $I_H=160$, $I_N=1024$, $I_Z=160$, $I_K=380$, $I_E=128$, and b=3, which gives a signature of only 1532 bits for a 1024-bit RSA modulus.

FIG. 1 illustrates a method of generating a digital signature for a message m and of verifying the digital signature, according to a preferred embodiment of the invention. The flowchart illustrates the procedure hereinbefore. In step 110, the public key pk and the private key sk are generated. Then the offline part y of the digital signature is generated in step 120. Once the message m is received in step 130, the online part k may be calculated and used to generate the complete digital signature σ in step 140. The digital signature σ and the public key are sent in step 150 and the digital signature σ is verified in step 160.

Figure 2:
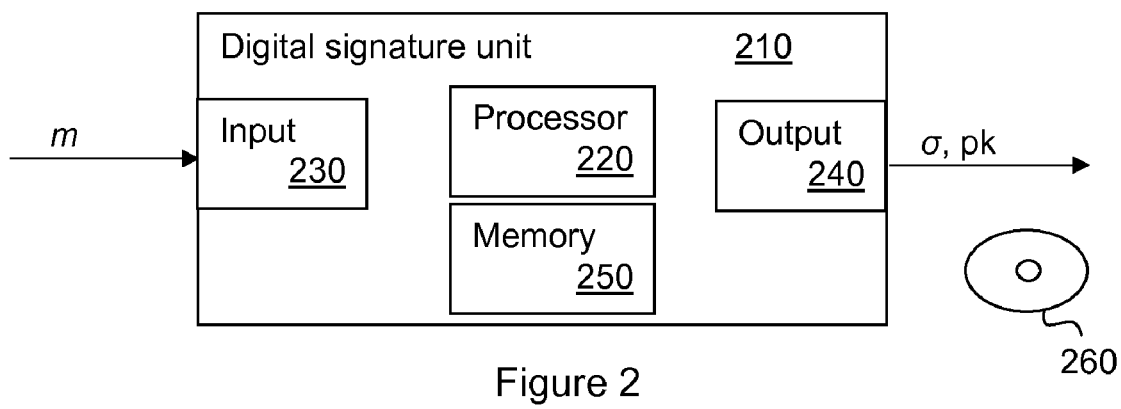
FIG. 2 illustrates a unit for generating at least one digital signature according to a preferred embodiment of the invention.

FIG. 2 illustrates a unit 210 for generating at least one digital signature according to a preferred embodiment of the invention. The digital signature unit 210 comprises an input unit 230 adapted to receive a message m to sign, and an output unit 240 adapted to send a digital signature σ. The output unit 240 may be adapted to send a public key pk used for the signature. The output unit 240 may also be adapted to send the message m along with, or separately from, the corresponding digital signature σ (and, as the case may be, the public key pk). It will be appreciated that the input unit 230 and the output unit 240 may be combined as an input/output unit (not shown).

The digital signing unit 210 further comprises at least one processor 220 (hereinafter "processor") adapted to perform the calculations for generating the digital signature for the received message m. The digital signing unit also comprises a memory 250 adapted to store data necessary for the calculations.

The person skilled in the art will appreciate that it is possible for the digital signing device 210 to store a number of so-called coupons, i.e. pre-calculated offline signature parts. It will further be appreciated that such coupons may be provided by a source external to the digital signing unit 210, such as for example during manufacture, in which case the input unit 230 (or another suitable unit; not shown) is adapted to receive such coupons.

The skilled person will appreciate that it is also possible for the digital signature unit 210 to generate the message m that it signs. In this case, the output unit 240 is advantageously further adapted to send the message m.

FIG. 2 also illustrates a computer program support 260, such as an exemplary CD-ROM, that stores instructions that, when executed in the processor 220, perform the method of signing a message m as described hereinbefore.

Figure 3:
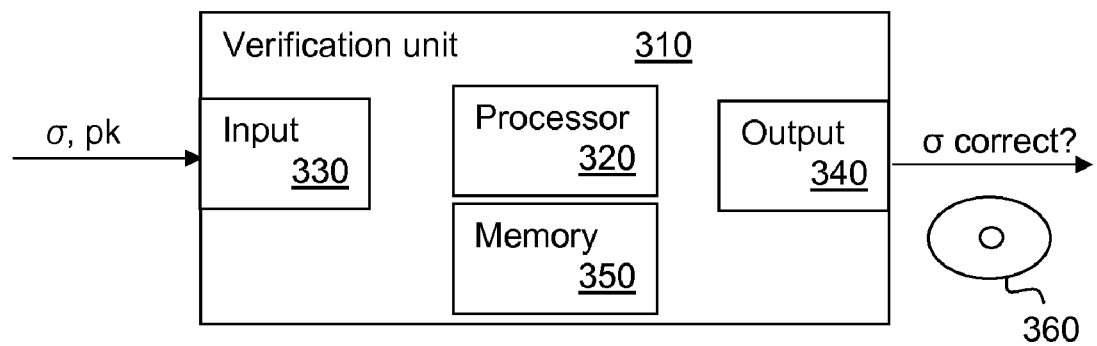
FIG. 3 illustrates a unit for verifying a digital signature of a message m, according to a preferred embodiment of the invention.

FIG. 3 illustrates a unit 310 for verifying a digital signature of a message m, according to a preferred embodiment of the invention. The verification unit 310 comprises an input 330 adapted to receive a digital signature σ and, if necessary, a public key pk used for the signature. It will be appreciated that the verification unit 310 may possess a number of public keys corresponding to digital signature units. The verification unit 310 further comprises an output unit 340 adapted to output information whether or not the received digital signature σ is correct. The verification unit 310 may also comprise a unit (which may be comprised in the output unit 340) for sending the message m to be signed. The input unit 330 may also be adapted to receive the message m along with, or separately from, the corresponding digital signature σ (and, as the case may be, the public key pk).

The verification unit 310 further comprises at least one processor 320 (hereinafter "processor") adapted to perform the calculations necessary to verify the digital signature σ, and a memory 350 adapted to store data necessary for verification of message m, in particular the message m itself.

FIG. 3 also illustrates a computer program support 360, such as an exemplary CD-ROM, that stores instructions that, when executed in the processor 320, perform the method of verifying the signature σ for the message m as described hereinbefore.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

It will be appreciated that in the description and the claims, the expression "random" should be read as "random or pseudo-random".

Reference numerals appearing in the claims are by way of illustration only and shall have no limiting effect on the scope of the claims.

The invention claimed is:

1. A method of generating a signature σ for a message m, the method comprising the steps, in a device, of:
   obtaining three integers y, e, t, satisfying $y=(xg^{-t})^{1/c}$ mod N, where $c=e^b$, b being a positive integer, and x, g, and N are elements of a public key, x and g being quadratic residues in $Z^*_N$ and N being an $I_N$-bit integer;
   calculating a first part k of a signature σ, wherein the calculation of k comprises an integer multiplication of m and an $I_Z$-bit integer z and an addition of t; and
   outputting the signature σ, the signature σ comprising at least three values k, y, and e,
   wherein the lengths of k, e, z, N, and h, h being an integer element of the public key, the lengths respectively being denoted $I_K$, $I_E$, $I_Z$, $I_N$, and $I_H$, satisfy the following relations for a given value b, which denotes the relation between c and e:

$I_N \geq 2(I_E+2);$ $b(I_E-1) \geq I_K+1;$ and $I_N-4 \geq I_K.$

2. The method of claim 1, wherein N is a RSA modulus comprising at least two primes p and q.

3. The method of claim 2, wherein p=2p'+1 and q=2q'+1, where p' and q' are prime.

4. The method of claim 1, wherein the step of obtaining three values y, e, t, comprises the steps of:
   generating a prime e and an integer t and
   calculating $y=(xg^{-t})^{1/c}$ mod N.

5. The method of claim 1, wherein the three values y, e, t are obtained from a coupon stored in a memory.

6. The method of claim 1, further comprising the step, between the obtention step and the calculation step, of receiving the message m.

7. The method of claim 1, wherein the outputting step further comprises outputting the message m.

8. A method of verifying a signature σ for a message m, the signature being generated by a method according to claim 1, the verification method comprising the step, in a device, of:

verifying that $y^c g^k h^m \equiv x \pmod{N}$, wherein c depends on e and h is an element of the public key.

9. The method of claim 8, further comprising the step of verifying that e is odd.

10. The method of claim 8, further comprising the step of verifying that e is a $I_E$-bit integer and that k is a $I_K$-bit integer.

11. A device for generating a signature σ for a message m, the signature device comprising:

a processor adapted to:

obtain three integers y, e, t, satisfying $y = (x g^{-t})^{1/c} \mod N$, where c depends on e, and x, g, and N are elements of a public key, x and g being quadratic residues in $Z^*_N$ and N being an $I_N$-bit integer; and calculate a first part k of a signature σ wherein the calculation of k comprises an integer multiplication of m and an $I_Z$-bit integer z and an addition of t; and an output unit adapted to output the signature σ, the signature σ comprising at least three values k, y, and e, wherein the lengths of k, e, z, N, and h, h being an integer element of the public key, the lengths respectively being denoted $I_K$, $I_E$, $I_Z$, $I_N$, and $I_H$, satisfy the following relations for a given value b, which denotes the relation between c and e:

$I_N \geq 2(I_E + 2)$;

$b(I_E - 1) \geq I_K + 1$; and $I_N - 4 \geq I_K$.

12. A device for verifying a signature σ for a message m, the signature being generated by a method according to claim 1, the verification device comprising a processor adapted to:

verify that $y^c g^k h^m \equiv x \pmod{N}$, wherein c depends on e and h is an element of the public key.

13. A computer program support storing instructions that, when executed in a processor, perform the method of signing a message m of claim 1.

14. A computer program support storing instructions that, when executed in a processor, perform the method of verifying the signature σ for a message m of claim 8.

15. The method of claim 1, wherein $I_K$ is much greater than $I_Z + I_H$.

16. The device of claim 11, wherein $I_K$ is much greater than $I_Z + I_H$.

* * * * *